United States Patent [19]

Falke et al.

[11] Patent Number: 6,063,308

[45] Date of Patent: May 16, 2000

[54] PREPARATION OF A HOMOGENEOUS POLYOL COMPONENT WHICH IS STABLE TO SEPARATION

[75] Inventors: Peter Falke, Schwarzheide; Regina Hendreich, Frauendorf; Ralf Fritz, Ellerstadt; Inge Rotermund, Ortrand, all of Germany

[73] Assignee: BASF Aktiengesellschaft, Ludwigshafen, Germany

[21] Appl. No.: 09/024,787

[22] Filed: Feb. 17, 1998

[51] Int. Cl.⁷ .................................................. C09K 3/00
[52] U.S. Cl. .................... 252/182.2; 252/182.24; 252/182.26; 252/182.27; 252/182.29; 521/128; 521/155; 521/164; 521/167; 521/170; 521/174
[58] Field of Search .................. 252/182.24, 182.27, 252/182.29, 182.2, 182.26; 521/155, 170, 174, 167, 164, 128

[56] References Cited

U.S. PATENT DOCUMENTS

| | | |
|---|---|---|
| 3,945,939 | 3/1976 | Barron . |
| 4,385,133 | 5/1983 | Alberino et al. . |
| 4,530,941 | 7/1985 | Turner et al. ........................... 521/175 |
| 4,576,731 | 3/1986 | Rieck . |
| 4,644,015 | 2/1987 | Scaccia et al. . |
| 4,786,435 | 11/1988 | Tufts . |
| 5,384,385 | 1/1995 | Trinks et al. . |

FOREIGN PATENT DOCUMENTS

| | | |
|---|---|---|
| 0116172 | of 0000 | European Pat. Off. . |
| 0543250 | of 0000 | European Pat. Off. . |
| 07110617 | of 0000 | Japan . |

*Primary Examiner*—John M. Cooney, Jr.
*Attorney, Agent, or Firm*—Fernando A. Borrego

[57] ABSTRACT

A process for preparing a homogeneous polyol component which is stable to separation and consists of at least one compound of relatively high molecular weight having at least two reactive hydrogen atoms and low-molecular-weight chain extenders and/or crosslinkers and, if desired, of blowing agents, catalysts and other auxiliaries and/or additives comprises the addition to this component of at least one amine and at least one organic and/or modified organic isocyanate; the invention also provides the corresponding polyol component which is stable to separation.

The use of this polyol component for preparing PUR, in particular compact or foamed PUR, is also described.

20 Claims, No Drawings

PREPARATION OF A HOMOGENEOUS POLYOL COMPONENT WHICH IS STABLE TO SEPARATION

The invention relates to a process for preparing a homogeneous polyurethane component consisting of one or more compounds of relatively high molecular weight having at least two reactive hydrogen atoms, in particular of polyols, and of proportions of chain extenders and/or crosslinkers and, if desired, of blowing agents, catalysts and other auxiliaries and/or additives.

These components made from polyols and high proportions of chain extenders and/or crosslinkers often tend to separate after a short time.

The invention takes the form of a process in which the addition of small proportions of primary and/or secondary amines and/or alkanolamines and a subsequent reaction of the resultant homogenized polyol component with small proportions of isocyanates and/or compounds carrying NCO groups can achieve a blend which is permanently stable to separation.

The preparation of polyurethanes (PURs) by reacting organic and/or modified organic polyisocyanates and/or prepolymers with compounds of higher functionality having at least two reactive hydrogen atoms, for example polyoxyalkylene polyamines and/or preferably organic polyhydroxyl compounds, in particular polyetherols having molecular weights of, for example, from 300 to 6000, and chain extenders and/or crosslinkers having molecular weights of up to about 400, in the presence, if desired, of catalysts, blowing agents and auxiliaries and/or additives, is known and has been described many times. A review of the preparation of polyurethane foams is given, for example, in Kunststoff-Handbuch, Vol. VII, Polyurethane, 1st Edition 1966, Ed. Dr R. Vieweg and Dr A. Höchtlen and 2nd Edition, 1983, and 3rd Edition, 1993, in each case edited by Dr G. Oertel (Carl Hanser Verlag, Munich).

For many application sectors, it is often desirable to introduce significant proportions of chain extenders and/or crosslinkers into the polyol component, since this can have a positive effect on a large number of properties. However, a disadvantage is that these polyol mixtures do not remain homogeneous, but develop separate phases after a relatively short time.

Attempts have therefore be made to prevent phase separation of such components by using colloidal silica (U.S. Pat. No. 3,945,939). This process is very complicated and furthermore affects the processing properties of the system.

In JP-A-07110617 it was attempted to improve the miscibility of such components by means of a specific polyol structure. This requires specific compatibility-promoting polyols, which are otherwise not used in the system.

EP-A-0543250 describes an agent which prevents separation and is made from dicyandiamide, guanidine and guanidine derivatives. Once again, these additives can affect than processing behavior of the PUR system.

U.S. Pat. No. 4,786,435 describes the use of phenol derivatives for phase homogenization. These phenol additives are not advantageous in many PUR applications.

In EP-A-0116172, an attempt is made to ensure phase homogeneity by introducing urethane structures created in situ. However, significant urethane proportions are generally required here.

In U.S. Pat. No. 4,385,133, polyols rich in ethylene oxide serve as solubility promoters. The use of these derivatives in the PUR systems is often possible only to a limited extent, since they greatly affect reactivity and cell opening.

It is an object of the present invention to create a process for preparing homogeneous polyol-chain-extender mixtures and/or polyol-crosslinker mixtures which do not separate and which may, if desired, contain blowing agents, catalysts and other auxiliaries and/or additives.

We have found that this object is achieved by adding, to the mixture of the abovementioned starting materials, at least one amine and at least one organic and/or modified organic isocyanate.

The invention therefore provides a process for preparing a homogeneous polyol component which is stable to separation and consists of at least one compound of relatively high molecular weight having at least two reactive hydrogen atoms and low-molecular-weight chain extenders and/or crosslinkers and, if desired, of blowing agents, catalysts and other auxiliaries and/or additives, which comprises the addition to this component of at least one amine and at least one organic and/or modified organic isocyanate; the invention also provides the corresponding polyol component which is stable to separation.

The invention further provides the use of this polyol component for preparing PUR, in particular compact or foamed PUR.

Surprisingly, it has been found that mixtures which have good shelf-life can be obtained from chain extenders/crosslinkers and polyols if these are mixed with specific amine derivatives, in particular primary amines, and this mixture is reacted with a small amount of isocyanate. The mixing of even small proportions of primary and/or secondary amines and/or alkanolamines into a mixture, homogenized by agitation, of one Dr more polyols and the appropriate proportions of chain extenders and/or crosslinkers and, if desired, blowing agents, catalysts and other auxiliaries and/or additives, together with a subsequent reaction of the resultant mixture with small amounts of added isocyanates and/or compounds carrying NCO groups, is sufficient to obtain a homogeneous component with good long-term shelf life. The species which are formed during this procedure are effective in preventing phase separation. The component increases slightly in viscosity, and this indicates the success of the reaction. Since the amounts which are reacted are only small, no increase in temperature is noted. Thus this type of stabilization of the mixtures of polyol and chain extenders/crosslinkers has no disadvantageous effects on the final properties of the resultant polyurethanes.

According to the invention, this process makes it possible to use, in a polyol component, compounds of higher molecular weight having at least two reactive hydrogen atoms and low-molecular-weight chain extenders and/or crosslinkers which are immiscible or miscible only with difficulty.

Compounds of higher molecular weight having at least two reactive hydrogen atoms are preferably those having acidic hydrogen atoms, in particular polyetherols and/or polyesterols. In principle, it is possible to incorporate for this purpose any of the higher-molecular-weight compounds which are conventional in PUR chemistry and have at least two reactive hydrogen atoms, such compounds being described, for example, below in the details of component (b).

The low-molecular-weight chain extender and/or crosslinker may likewise in principle be any of the conventional chain extenders and/or crosslinkers which are conventional in PUR chemistry, for example as described below in the details of component (c). The mean molecular weight of the chain extenders and/or crosslinkers used is advantageously from 62 to 600 g/mol.

Examples which may be used according to the invention are mixtures of the following higher-molecular-weight compounds having at least two reactive hydrogen atoms with low-molecular-weight chain extenders and/or crosslinkers such as a mixture of polyether alcohols having terminal primary OH groups and ethylene glycol and/or 1,4-butanediol in proportions of >10 parts by weight, based on the polyether alcohol, or mixtures of adipates (mean molecular weight >1000 g/mol) and ethylene glycol in proportions of >10 parts by weight, which also tend to separate after a short time.

The immiscible or almost immiscible higher-molecular-weight compounds having at least two reactive hydrogen atoms and low-molecular-weight chain extenders and/or crosslinkers are advantageously used in a ratio to one another of from 95:5 to 70:30 parts by weight, preferably from 90:10 to 80:20 parts by weight.

The proportion of the chain extenders and/or crosslinkers, based on the polyol component here is preferably from 1 to 30 parts by weight, in particular from 3 to 25 parts by weight.

The proportion of the higher-molecular-weight compounds having at least two reactive hydrogen atoms, based on the polyol component, is preferably from 70 to 95 parts by weight.

The homogeneous polyol component which is stable to separation is produced according to the invention by adding small proportions of specific amine derivatives to the constituents of the polyol component, consisting of at least one higher-molecular-weight compound having at least two reactive hydrogen atoms and of low-molecular-weight chain extenders and/or crosslinkers and, if desired, of blowing agents, catalysts and other auxiliaries and/or additives. This mixture is mixed by intensive stirring A small amount of an isocyanate is added there and the entire mixture is mixed. In an advantageous embodiment, intensive agitation is carried out for 20 minutes at room temperature after the isocyanates are added.

It is also possible to stir the isocyanate with a part of the basic polyol, before preparing the polyol component which is stable to separation, and then to add the other constituents of the polyol component.

If water is used as blowing agent, it has proven useful not to add this to the polyol component during preparation of the dispersion, but only later, before the preparation of the PUR. Other system constituents may likewise also be added subsequently to the polyol component.

The amines used according to the invention are preferably primary and/or secondary amines, particularly preferably primary amines. These amines should be polyfunctional, but may also contain proportions of monofunctional amines. Suitable amines are preferably aliphatic and/or cycloaliphatic amines. The amine derivatives may have other functional groups, such as —OH or —SH. Proportions of alkanolamines and amine mixtures may likewise be used.

Examples of such compounds are: hexamethylenediamine, ethylenediamine, 4,4'-methylenebiscyclohexylamine, polyols carrying $NH_2$ groups, for example Jeffamine grades, 3,3'-imidopropylamine, fatty amines, diethylenetriamine, triethylenetetramine, propylenediamine, butylenediamine, diethanolamine and ethanolamine.

It is also possible according to the invention to use aromatic amines which are conventional in polyurethene chemistry, such as tolylenediamines, in particular diethyltolylenediamine, or amines of the diphenylmethane series.

Preference is given to the use of 2,2'-dimethyl-4,4'-methylenebiscyclohexylamine, coconut fatty amine and N-oleylpropylenediamine.

The amines are used in proportions of from 0.05 to 7% by weight, preferably from 0.5 to 3.0% by weight, based on the weight of the polyol component.

At least one organic and/or modified organic isocyanate is then admixed, using agitation or another suitable mixing technique, with the polyol component to which the appropriate primary or secondary amine has been added. In principle, any isocyanate specified below as component (a) may be used for this purpose, but preference is given to aromatic isocyanates. Particular preference is given to tolylene 2,4- and 2,6-diisocyanates, diphenylmethane 4,4'- and 2,4'-diisocyanates, polyphenyl polymethylene polyisocyanates and prepolyners containing NCO groups and mixtures of these compounds.

The organic and/or modified organic isocyanates here are used in proportions of from 0.05 to 5% by weight, preferably from 0.5 to 2.0% by weight, based on the weight of the polyol component.

Polyol components which are particularly stable to separation are obtained if from 0.5 to 2.0% by weight of amine and from 0.5 to 2.0% by weight of isocyanate are processed with the other constituents of the polyol component.

The reaction which takes place after the organic and/or modified organic isocyanates are added is noticeable by an increase in viscosity.

A polyol component which is stable to separation and which is prepared according to the invention is homogeneous and stable to settling out, even over a relatively long storage time. There is no requirement for the agitation of the polyol component which is otherwise necessary before processing.

The homogeneous polyol component according to the invention, which is stable to separation, consisting of at least one higher-molecular-weight compound having at least two reactive hydrogen atoms and of low-molecular-weight chain extenders and/or crosslinkers and, if desired, of blowing agents, catalysts and other auxiliaries and/or additives, may be prepared by adding at least one amine and at least one organic and/or modified organic isocyanate.

It is preferably used for preparing polyurethanes.

The polyurethanes are prepared in a manner known per se by reacting a) organic and/or modified organic isocyanates with b) at least one higher-molecular-weight compound having at least two reactive hydrogen atoms and c) low-molecular-weight chain extenders and/or crosslinkers and, if desired, d) blowing agents, e) catalysts and f) other auxiliaries and/or additives.

According to the invention, a homogeneous polyol component having good shelf-life is firstly prepared from components (b) and (c) and, if desired, (d) to (f) in combination with at least one amine and at least one organic and/or modified organic isocyanate as described above, and this component, preferably after storage and, if desired, with addition of further components (b) to (f) or of proportions of these components, is then reacted with component (a).

For preparing the homogeneous polyol component which is stable to separation and the PUR based upon this component, use is made not only of the abovementioned specific and preferably used compounds but also of formative components known per se, for which the following details are given:

a) Suitable organic and/or modified organic isocyanates for preparing the PURs according to the invention and for stabilizing the polyol component are the aliphatic, cycloaliphatic, araliphatic and preferably aromatic polyfunctional isocyanates known per sea.

Specific examples are: alkylene diisocyanates having from 4 to 12 carbon atoms in the alkylene radical, such as dodecane 1,12-diisocyanate, 2-ethyltetramethylere 1,4-diisocyanate, 2-methylpentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanate and any desired mixtures of these isomers, 1-isocyanato-3,3,5-trimethyl-5-isocyanatomethylcyclohexane (isophorone diisocyanate), 2,4- and 2,6-hexahydrotolylene diisocyanate and the corresponding isomer mixtures, dicyclohexylmethane 4,4'-, 2,2'- and 2,4'-diisocyanate and the corresponding isomer mixtures, and preferably aromatic di- and polyisocyanates, such as tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,4'-diisocyanates, polyphenylpolymethylene polyisocyanates, mixtures of diphenylmethane 4,4'-, 2,4'- and 2,2'-diisocyanates and polyphenylpolymethylene polyisocyanates (raw MDI) and mixtures of raw MDI and tolylene diisocyanates. The organic di- and polyisocyanates can be used individually or in the form of their mixtures.

Use is also frequently made of modified polyfunctional isocyanates, i.e. products obtained by chemical reaction of organic di- and/or polyisocyanates. Examples are di- and/or polyisocyanates containing ester groups, urea groups, biuret groups, allophanate groups, carbodiim.Lde groups, isocyanurate groups, uretdione groups and/or urethane groups. Specific examples are: organic, preferably aromatic, polyisocyanates containing urethane groups and having NCO contents of from 33.6 to 15% by weight, preferably from 31 to 21% by weight, based on the total weight, for example with low-molecular-weight diols, triols, dialkylene glycols, trialkylene glycols or polyoxyalkylene glycols having molecular weights up to 6000, in particular having molecular weights up to 1500, modified diphenylmethane 4,4'-diisocyanate, modified diphenylmethane 4,4'- and 2,4'-diisocyanate mixtures, modified raw MDI or tolylene 2,4- and/or 2,6-diisocyanate, examples of dialkylene or polyoxyalkylene glycols, which may be used alone or as mixtures, being: diethylene glycol, dipropylene glycol, polyoxyethylene glycol, polyoxypropylene glycol and polyoxypropylene-polyoxyethylene glycol, and the corresponding triols and/or tetrols.

Other suitable compounds are prepolymers containing NCO groups and having NCO contents of from 25 to 3.5% by weight, preferably from 21 to 14% by weight, based on the total weight, and prepared from the polyester polyols described below and/or preferably the polyether polyols described below and diphenylmethane 4,4'-diisocyanate, mixtures of diphenylmethane 2,4'- and 4,4'-diisocyanate, tolylene 2,4- and/or 2,6-diisocyanates or raw MDI. Other compounds which have proven useful are liquid polyisocyanates containing carbodiimide groups and/or isocyanurate( rings and having NCO contents of from 33.6 to 15% by weight:, preferably from 31 to 21% by weight, based on the total weight, e.g. based on diphenylmethane 4,4'-, 2,4'- and/or 2,4'-diisocyanate and/or tolylene 2,4- and/or 2,6-diisocyanate. The modified polyisocyanates may, if desired, be mixed with one another or with unmodified organic polyisocyanates, such as diphenylmethane 2,4'- and/or 4,4'-diisocyanate, raw MDI, tolylene 2,4- and/or 2,6-diisocyanate.

Organic polyisocyanates which have proven especially useful and which are therefore preferably used are: tolylene diisocyanate, MDI, raw MDI, mixtures of tolylene diisocyanates and raw MDI or mixtures of modified organic polyisocyanates which contain urethane groups and have an NCO content of from 33.6 to 15% by weight, in particular those based on tolylene diisocyanates, diphtenylmethane 4,4'-diisocyanate, diphenylmethane diisocyanate isomer mixtures or raw MDI and in particular raw MDI having a diphenylmethane diisocyanate isomer content of from 30 to 80% by weight, preferably from 30 to 55% by weight.

b) Higher-molecular-weight compounds b) having at least two reactive hydrogen atoms, besides those described above as examples, are expediently those having a functionality of from 2 to 4, preferably from 2 to 3, and a molecular weight of from 300 to 10000, preferably from 300 to 5000.

Examples of compounds which have proven useful are polyether polyamines and/or preferably polyols selected from the class consisting of polyether polyols, polyester polyols, polythioether polyols, polyesteramides, hydroxyl-containing polyacetals, hydroxyl-containing aliphatic polycarbonates and mixtures of at least two of the polyols mentioned. Preference is given to use of polyester polyols and/or polyether polyols. The hydroxyl number of the polyhydroxy compounds here is generally from 20 to 80 and preferably from 28 to 56.

Suitable polyester polyols can be prepared, for example, from organic dicarboxylic acids having from 2 to 12 carbon atoms, preferably aliphatic dicarboxylic acid having from 4 to 6 carbon atoms, and polyhydric alcohol, preferably diols, having from 2 to 12 carbon atoms, preferably from 2 to 6 carbon atoms. Examples of dicarboxylic acids are: succinic acid, glutaric acid, adipic acid, subaric acid, azelaic acid, sebacic acid, decanedicarboxylic acid, maleic acid, fumaric acid, phthalic acid, isophthalic acid and terephthalic acid The dicarboxylic acids here may be used either in mixtures with one another or individually. The corresponding dicarboxylic acid derivatives, such as dicarboxylic esters of alcohols having from 1 to 4 carbon atoms or dicarboxylic anhydrides may be used instead of the free dicarboxylic acids. Preference is given to the use of dicarboxylic acid mixtures of succinic, glutaric and adipic acid in a mixing ratio of, for example, from 20 to 35 : from 35 to 50 : from 20 to 32 parts by weight, and in particular adipic acid.

Examples of di- and polyhydric alcohols, in particular diols, are: ethanediol, diethylene glycol, 1,2- and 1,3-propanediol, dipropylene glycol, 1,4-butanediol, 1,5-pentanediol, 1,6-hexanediol, 1,10-decanediol, glycerol and trimethylolpropane. Preference is given to the use of ethanediol, diethylene glycol, 1,4-butanediol, 1,5-pentanediol or 1,6-hexanediol. Polyester polyols, derived from lactones, such as $\epsilon$-caprolactone, or hydroxycarboxylic acids, such as $\omega$-hydroxycaproic acid, may also be used.

To prepare the polyester polyols, the organic, for example aromatic, and preferably aliphatic, polycarboxylic acids and/or their derivatives and polyhydric alcohols can be polycondensed without catalysts or preferably in the presence of transesterification catalysts, expediently in an atmosphere of inert gas, such as nitrogen, carbon monoxide, helium, argon etc., in melt form at from 150 to 250° C., preferably from 180 to 220° C., under reduced pressure if desired, to the desired acid number of advantageously less than 10, preferably less than 2. In a preferred embodiment, the transesterification mixture is polycondensed at the abovementioned temperatures to an acid number of from 80 to 30, preferably from 40 to 30, at atmospheric pressure and then under a pressure of less than 500 mbar, preferably from 50 to 150 mbar. Examples of suitable transesterification catalysts are iron, cadmium, cobalt, lead, zinc, antimony, magnesium, titanium and tin, in the form of metals, metal oxides or metal salts. The polycondensation may, however, also be carried out in liquid phase in the presence of diluents and/or entrainers, such as benzene, toluene, xylene or chlorobenzene, for removal of the welter of condensation by azeotropic distillation.

To prepare the polyester polyols, the organic polycarboxylic acids and/or their derivatives and pollhydric alcohols are polycondensed advantageously in a molar ratio of 1: from 1 to 1.8, preferably 1: from 1.05 to 1.2. The resultant polyester polyols preferably have a functionality of from 2 to 4, in particular from 2 to 3, and a molecular weight of from 480 to 3000, in particular from 600 to 2000.

However, polyols which are used in particular are polyether polyols prepared by known processes from one or more alkylene oxides having from 2 to 4 carbon atoms in the alkylene radical for example by anionic polymerization using alkali metal hydroxides, such as sodium hydroxide or potassium hydroxide, or alkali metal alkoxides, such as sodium methoxide, sodium ethoxide, potassium ethoxide or potassium isopropoxide as catalysts and with addition of at least one initiator molecule having from 2 to 4, preferably from 2 to 3, reactive hydrogen atoms in its stricture, or by cationic polymerization using Lewis acids, such as antimony pentachloride, boron fluoride etherate, etc., or bleaching earth as catalysts.

For specific applications, it is also possible to bond monofunctional initiators into the polyether structure. Examples of suitable alkylene oxides are tetrahydrofuran, 1,3-propylene oxide, 1,2- and/or 2,3-butylene oxide, styrene oxide and preferably ethylene oxide and 1,2-propylene oxide. The alkylene oxides may be used individually, alternating in sequence or as mixtures.

Examples of initiator molecules are: water, organic dicarboxylic acids, such as succinic acid, adipic acid, phthalic acid and terephthalic acid, aliphatic and aromatic diamines, which may be unsubstituted or have N-mono-, N,N- or N,N'-dialkyl substitution, having from 1 to 4 carbon atoms in the alkyl radical, such as unsubstituted or mono- or dialkyl-substituted ethylenediamine, diethylenetriamine, triethylenetetramine, 1,3-propylenediamine, 1,3- or 1,4-butylenediamine, 1,2-, 1,3-, 1,4-, 1,5- or 1,6-hexamethylenediamine, phenylenediamnine, 2,3-, 2,4- or 2,6-tolylenediamine or 4,4'-, 2,4'- or 2,2'-diaminodiphenylmethane. Other initiator molecules which are suitable are: alkanolamines, such zis ethanolamine and N-methyl- and N-ethylethanolamine, dialkanolamines, such as diethanolamine and N-methyl- and N-ethyldiethanolamine, and trialkanolamines, such as triethanolamine, and ammonia. Preference is given to the use of polyhydric, in particular di- and/or trihydric alcohols, such as ethanediol, 1,2-propanediol, 2,3-propanediol, diethylene glycol, dipropylene glycol, 1,4-butanediol, 1,6-hexanediol, glycerol, trimethylolpropane and pentaerythritol.

The polyether polyols, preferably polyoxypropylene polyols and polyoxypropylene-polyoxyethylene polyols, have a functionality of preferably from 2 to 4 and in particular from 2 to 3, and molecular weights of from 300 to 8000, preferably from 300 to 6000, and in particular from 1000 to 5000, and suitable polyoxytetramethylene glycols have a molecular weight of up to about 3500.

Other suitable polyether polyols are polymer-modified polyether polyols, preferably graft polyether polyols, in particular those based on styrene and/or acrylonitrile and prepared by in situ polymerization of acrylonitrile, styrene or preferably mixtures of styrene and acrylonitrile, e.g. in a weight ratio of from 90 : 10 to 10 : 90, preferably from 70 : 30 to 30 : 70, expediently in the abovementioned polyether polyols, using as a basis the information given in the German Patents 11 11 394, 12 22 669 (U.S. Pat. Nos. 3,304,273, 3,383,351, 3,523,093), 11 52 536 (GB 10 40 452) and 11 52 537 (GB 987 618), and polyether polyol dispersions which contain, for example, as disperse phase, usually in an amount of from 1 to 50% by weight, preferably from 2 to 25% by weight: polyureas, polyhydrazides, melamine and/or polyurethanes containing bonded tertiary amino groups, and which are described, for example, in EP-B-011 752 (U.S. Pat. No. 4,304,708), U.S. Pat. No. 4,374,209 and DE-A-32 31 497.

The polyether polyols may, like the polyester polyols, be used individually or in the form of mixtures. They may also be mixed with the graft polyether polyols or polyester polyols and with the hydroxyl-containing polyester amides, polyacetals, polycarbonates and/or polyether polyamines.

Examples of hydroxyl-containing polyacetals are the compounds which can be prepared from glycols, such as diethylene glycol, triethylene glycol, 4,4'-dihydroxyethoxydiphenyldimethylmethane or hexanediol and formaldehyde. Suitable polyacetals may also be prepared by polymerizing cyclic acetals.

Suitable hydroxyl-containing polycarbonates are those of the type known per se, which can be prepared, for example, by reacting diols, such as 1,3-propanediol, 1,4-butanediol and/or 1,6-hexanediol, diethylene glycol, triethylene glycol or tetraethylene glycol with diaryl carbonates, such as diphenyl carbonate, or phosgene.

Examples of polyester amides are the predominantly linear condensates which are obtained from polybasic, saturated and/or unsaturated carboxylic acids and/or their anhydrides and polyhydric saturated and/or unsaturated aminoalcohols or mixtures of polyhydric alcohols and aminoalcohols and/or polyamines.

Suitable polyether polyamines can be prepared from the abovementioned polyether polyols by known processes, for example the cyanoalkylation of polyoxyalkylene polyols followed by hydrogenation of the resultant nitrile (U.S. Pat. No. 3,267,050) or the partial or complete amination of polyoxyalkylene polyols with amines or ammonia in the presence of hydrogen and catalysts (DE-A-12 15 373).

Besides the higher-molecular-weight compounds having at least two reactive hydrogen atoms, it is of course also possible to use, in addition, those which have only one reactive hydrogen atom, in particular monools.

c) Chain extenders and/or crosslinkers which are used are diols and/or triols having molecular weights of less than 600, preferably from 60 to 300. Examples of these are aliphatic, cycloaliphatic and/or araliphatic diols having from 2 to 14, preferably from 4 to 10, carbon atoms, such as ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis(2-hydroxyethyl) hydroquinone, triols, such as 1,2,4- and 1,3,5-trihydroxycyclohexane, glycerol and trimethylolpropane, and low-molecular-weight hydroxyl-containing polyalkylene oxides based on ethylene oxide and/or 1,2-propylene oxide and the abovementioned diols and/or triols as initiator molecules.

The chain extenders, crosslinkers or mixtures of these are expediently used in an amount of from 1 to 30% by weight, preferably from 3 to 25% by weight, based on component (b).

d) The blowing agents used may be the fluorochlorohydrocarbons (FCHC) well known in polyurethane chemistry or highly fluorinated and/or perfluorinated hydrocarbons. However, for ecological reasons, the use of these materials has become very restricted or has entirely ceasec. Blowing agents which are available as alternatives to HFCHC and HFHC are in particular aliphatic and/or cycloaliphatic hydrocarbons, especially pentane and cyclopentane, cr acetals, such as methylal.

These physical blowing agents are usually added to the polyol component of the system, but they may also be added in the isocyanate component or added jointly both to the polyol component and also to the isocyanate component.

It is also possible to use them, together with highly fluorinated and/or perfluorinated hydrocarbons, in the form of a polyol component emulsion. If emulsifiers are used, these are usually oligomeric acrylate, with polyoxyalkylene radicals and fluoroalkane radicals as side groups in their structure and a fluorine content of from about 5 to 30% by weight. Such products are well known in plastics chemistry, e.g. EP-A-0351614.

The amount of the blowing agent or of the blowing agent mixture here is from 1 to 25% by weight, preferably from 1 to 15% by weight, based in each case on component (b).

It is moreover possible and usual to add water to the formative component (b) in an amount of from 0.5 to 15% by weight, preferably from 1 to 5% by weight, based on component (b), as blowing agent. The water may be added in combination with the use of the other blowing agents described.

e) Compounds used as catalysts for producing the polyurethanes according to the invention are those conventionally used in polyurethane chemistry, in particular those which bring about a pronounced acceleration of the reaction of the compounds of component (b) which contain reactive hydrogen atoms, in particular hydroxyl groups, and (c) i.e. used, with the organic, unmodified or modified organic isocyanates (a). Examples of suitable catalysts are organometallic compounds, such as iron(II) chloride, zinc chloride and lead octoate, and preferably organotin compounds, such as tin(II) salts of organic carboxylic acids, e.g. tin(II) acetate, tin(II) octoate, tin(II) ethylhexoate and tin(II) laurate, and the dialkyltin(IV) salts of organic carboxylic acids, such as dibutyltin diacetate, dibutyltin dilaurate, dibutyltin maleate and dioctyltin diacetate. The organometallic compounds are used alone or preferably in combination with strongly basic amines, for example aridines, such as 2,3-dimethyl-3,4,5,6-tetrahydropyrimidine, tertiary amines, such as triethylamine, tributylamine, dimethylbenzylamine, N-methyl-, N-ethyl- and N-cyclohexylmorpholine, N,N,N',N'-tetramethylethylenediamine, N,N,N',N'-tetramethylbutanediamine, N,N,N',N'-tetramethyl-1,6-hexanediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane and preferably 1,4-diazabicyclo[2.2.2]octane, and alkanol compounds, such as triethanolamine, triisopropanolamine, N-methyl- and N-ethyldiethanolamine and dimethylethanolamine.

Other suitable catalysts are: tris(dialkylaminoalkyl)-s-hexahydrotriazines, in particular tris(N,N-dimethylaminopropyl)-s-hexahydrotriazine, tetraalkylammonium hydroxides, such as tetramethylammonium hydroxide, alkali metal hydroxides, such as sodium hydroxide and alkali metal alkoxides, such as sodium methoxide and potassium isopropoxide, and alkali metal salts of long-chain fatty acids having from 10 to 20 carbon atoms and with or without OH side groups.

It is preferable to use from 0.001 to 5% by weight, in particular from 0.05 to 2% by weight, of catalyst or catalyst combination, based on the weight of formative component (b).

f) Other auxiliaries and/or additives may also be incorporated into the reaction mixture. Examples of these are flame retardants, surfactants, foam stabilizers, cell regulators, fillers, dyes, pigments, agents to protect against hydrolysis and substances with fungistatic and bacteriostatic action Details concerning the usable auxiliaries and additives, the other components and the process and reaction conditions for producing polyurethane may be found in the: specialist literature, for example in the Monograph of J. H. Saunders and K. C. Frisch, High Polymers, Vol. XVI, Polyurethanes, Part 1 and 2, Interscience Publishers 1962 and 1964, or from the Kunststoff-Handbuch mentioned earlier, Vol. VII, Polyurethane, or relevant patents, such as EP-A-0711798, DE-A-4408430 or DE-A-19502969.

For producing the polyurethanes, the components are preferably reacted in amounts giving a ratio of equivalents of NCO groups in the isocyanates (a) to the total of the reactive hydrogen atoms in the components (b) and, if used, (c) of from 0.80 to 1.25:1, preferably from 0.90 to 1.15:1.

It is advantageous to produce the polyurethanes by the one-shot process, for example using the high-pressure or low-pressure technique, in open or closed molds, for example metallic molds. It is also usual to apply the reaction mixture continuously onto suitable belt conveyors to produce foam blocks.

It has proven especially advantageous to operate with the two-component process and to use, as component (A), the component which is stable to separation according to the invention, consisting of components (b) and, if desire(ed, (c) to (f) and to use, as component (B), the organic and/or modified organic isocyanates (a) if desired in a mixture with other auxiliaries and/or additives (f).

The components (A) and (B) are preferably mixed at from 15 to 90° C., particularly from 20 to 60° C., and particularly preferably from 20 to 40° C., and introduced into the open mold or, if desired, under elevated pressure into the closed mold or, in the case of continuous operation, applied onto a belt which accepts the reaction mixture. The mixing can, as already stated, be carried out mechanically using a stirrer or spiral mixer or by high-pressure mixing in a nozzle. The mold temperature is expediently from 20 to 110° C., preferably from 30 to 60° C., and in particular from 35 to 55° C.

Using the homogeneous polyol component which is stable to separation according to the invention, it is possible to prepare polyurethanes having a wide property profile, such as flexible foams, rigid foams, coatings, cast elastorers, RIM, integral foams, crosslinked foams and thermoplastic PURs. The novel process is preferably used for preparing RIM and integral foams. The PUR and/or PUR foams produced by the novel process have a density of from 10 to 1500 kg/M$^3$. The present invention will be described in further detail using the following examples.

EXAMPLE 1

(Comparative Example)

80 parts by weight of Lupranol 2042 and 20 parts by weight of monoethylene glycol were mixed by intensive stirring at room temperature for 10 minutes to give a polyol-chain-extender mixture. To this were added 0.1 part by weight of DC 193, 0.2 part by weight of tetramethylhexametylenediamine, 0.8 part by weight of Dabco 33LV and 0.75 part by weight of water. A clear phase separation appeared after as little as 24 hours.

Example 1A

To the component homogenized by stirring in Example 1 were added 0.5 part by weight of 2,2'-dimethyl-4,4'-methylenebiscyclohexylamine, and the mixture was heated to 50° C. After stirring for 10 minutes at this temperature, 0.38 part by weight of Lupranat T 80 was added, with intensive stirring. After addition of the isocyanate, stirring was continued for a further 10 minutes. 0.1 part by weight of DC 193, 0.2 part by weight of tetramethylhexamethylenediamine, 0.8 part by weight of Dabco 33LV and 0.75 part by weight of water were adder.

The polyol component treated in this way had a shelf-life of at least 3 months. It could be converted without difficulty into an integral foam, the reaction conditions being the same as those for the use of the untreated component (Example 1).

EXAMPLE 2

(Comparative Example)

80 parts by weight of Lupranol 2042 and 20 parts by weight of 1,4-butanediol were mixed by stirring. A clear phase separation appeared after as little as 24 hours.

Example 2A

To the component homogenized by stirring in Example 2 were added 0.5 part by weight of 2,2'-dimethyl-4,4'-methylenebiscyclohexylamine, and the mixture was heated to 50° C. After stirring for 10 minutes at this temperature, 0.38 part by weight of Lupranat T 80 was added, with intensive stirring. After addition of the isocyanate, stirring was continued for a further 10 minutes.

The polyol-chain-extender mixture treater in this way had a shelf-life of at least 3 months. Its reactive behavior was identical with that of the untreated component (Example 2).

EXAMPLE 3

(Comparative Example)

85 parts by weight of Lupranol 2045 and 15 parts by weight of monoethylene glycol were intimately mixed by stirring for 10 minutes. After 24 hours, the initially homogeneous component separated into two phases.

Example 3A

To the component homogenized by stirring in Example 3 were added 0.5 part by weight of 2,2'-dimethyl-4,4'-methylenebiscyclohexylamine. After stirring for 15 minutes at this temperature, 0.54 part by weight of Lupranct MI was added, with intensive stirring. After addition of the isocyanate, stirring was continued for a further 10 minutes.

The polyol-chain-extender mixture treated in this way had a shelf-life of at least 3 months. Its reactive behavior was identical with that of the untreated component (Example 3).

EXAMPLE 4

(Comparative Example)

A mixture of 90 parts by weight of Lupraphen 8101 and 10 parts by weight of monoethylene glycol was homogenized by stirring. After about 8 days, the system began to separate.

Example 4A

To the component homogenized by stirring in Example 4 were added 0.25 part by weight of 2,2'-dimethyl-4,4'-methylenebiscyclohexylamine, and the mixture was heated to 50° C. After stirring for 15 minutes at this temperature, 0.19 part by weight of Lupranat T 80 was added, with intensive stirring. After addition of the isocyanate, stirring was continued for a further 10 minutes.

The polyol-chain-extender mixture treated in this way had a shelf-life of at least 3 months. Its reactive behavior was identical with that of the untreated component (Example 4).

EXAMPLE 5

(Comparative Example)

A mixture of 80 parts by weight of polytetrahydrofuran (PTHF) 2000 and 20 parts by weight of 1,4-butanediol was heated to 50° C. and homogenized by stirring. If the mixture was stored at this temperature, the system began to separate after 12 hours.

Example 5A

To the component homogenized by stirring in Example 5 were added 0.5 part by weight of 2,2'-dimethyl-4,4'-methylenebiscyclohexylamine, and the mixture was held at 50° C. After stirring for 15 minutes at this temperature, 0.38 part by weight of Lupranat T 80 was added, with intensive stirring. After addition of the isocyanate, stirring was continued for a further 10 minutes.

The polyol-chain-extender mixture treated in this way had a shelf-life of at least 3 months. Its reactive behavior was identical with that of the untreated component (Example 5).

Lupranol® 2045: OHN 35 mg KOH/g, polyether based on ethylene oxide and propylene oxide (BASF);

Lupranol® 2042: OHN 27 mg KOH/g, polyether based on ethylene oxide and propylene oxide (BASF);

Lupraphen® 8101: OHN 56 mg KOH/g, polyester alcohol based on adipic acid, ethylene and butylene glycol (BASF);

PTHF 2000: OHN 56 mg KOH/g (BASF);

Lupranat® T 80: NCO 48%;

Tolylene diisocyanate (80/20) (BASF);

Dabco 33LV: amine catalyst (Air Products);

DC 193: Silicone stabilizer (OSi)

We claim:

1. A process for preparing a homogeneous polyol component which is stable to separation comprising providing a polyol component comprising at least one compound of relatively high molecular weight having at least two reactive hydrogen atoms, low-molecular-weight chain extenders and/or crosslinkers and, optionally, blowing agents, catalysts and other auxiliaries and/or additives, and adding at least one amine in a proportion of from 0.05 to 7 percent by weight, based on the weight of the polyol component, and at least one organic and/or modified organic isocyanate in a proportion of from 0.05 to 5 percent by weight, based on the weight of the polyol component to said polyol component.

2. A process as claimed in claim 1, wherein the molecular weight of the chain extenders and/or crosslinkers is from 62 to 600 g/mol.

3. A process as claimed in claim 1, wherein the chain extenders and/or crosslinkers is present in an amount of, based on the polyol component, from 1 to 30 parts by weight.

4. A process as claimed in claim 1, wherein the relatively high molecular-weight compounds having at least two reactive hydrogen atoms are selected from the group consisting of polyetherols and polyesterols having acidic hydrogen atoms.

5. A process as claimed in claim 1, wherein the weight ratio of the relatively high molecular-weight compounds having at least two reactive hydrogen atoms to the chain extenders and/or crosslinkers is from 95:5 to 70:30.

6. A process as claimed in claim 1, wherein the amines are selected from the group consisting of primary and secondary amines.

7. A process as claimed in claim 1, wherein the amines are selected from the group consisting of aliphatic and cycloaliphatic amines.

8. A process as claimed in claim 1, wherein the organic and/or modified organic isocyanates are selected from the group consisting of aromatic isocyanates.

9. A process as claimed in claim 1, wherein the organic and/or modified organic isocyanates are selected from the group consisting of prepolymers containing NCO groups and NCO-containing reaction products.

10. A homogeneous polyol component which is stable to separation comprising at least one compound of relatively high molecular weight having at least two reactive hydrogen atoms, low-molecular-weight chain extenders and/or crosslinkers, at least one amine in a proportion of from 0.05 to 7 percent by weight, based on the weight of the polyol component, at least one organic and/or modified organic isocyanate in a proportion of from 0.05 to 5 percent by weight, based on the weight of the polyol component, and, optionally, a blowing agent, catalyst and other auxiliaries and/or additives.

11. A polyol component as claimed in claim 10, wherein the molecular weight of the chain extenders and/or crosslinkers is from 62 to 60 g/mol.

12. A polyol component as claimed in claim 10, wherein the chain extenders and/or crosslinkers are present in an amount of from 1 to 30 parts by weight, based on the weight of the polyol component.

13. A polyurethane component as claimed in claim 10, wherein the relatively high molecular weight compounds are selected from the group consisting of polyetherols and polyesterols having acidic hydrogen atoms.

14. A polyol component as claimed in claim 10, wherein the weight ratio of the relatively high molecular weight compounds to the chain extenders and/or crosslinkers is from 95:5 to 70:30.

15. A polyol component as claimed in claim 10, wherein the amines are selected from the group consisting of primary and secondary amines.

16. A polyol component as claimed in claim 10, wherein the amines are selected from the group consisting of aliphatic and cycloaliphatic amines.

17. A polyol component as claimed in claim 10, wherein the organic and/or modified organic isocyanates are selected from the group consisting of aromatic isocyanates.

18. A polyol component as claimed in claim 10, wherein the organic and/or modified organic isocyanates are selected from the group consisting of prepolymers containing NCO groups and NCO-containing reaction products.

19. A process for preparing a homogeneous polyol component which is stable to separation comprising the steps of:

providing a polyol component comprising at least one compound of relatively high molecular weight having at least two reactive hydrogen atoms, low-molecular-weight chain extenders and/or crosslinkers and, optionally, blowing agents, catalysts and other auxiliaries and/or additives;

adding a primary and/or secondary amine to said polyol component and blending the resultant mixture to produce a homogenized polyol component; and reacting said homogenized polyol component with an organic and/or modified organic isocyanate to produce the polyol composition having improved stability to separation.

20. A process as recited in claim 19, wherein the relatively high molecular weight compounds and low molecular weight chain extenders and/or crosslinkers are present in the polyol component in a weight ratio of from 90:10 to 80:20.

* * * * *